(12) United States Patent
Dobbin et al.

(10) Patent No.: US 9,951,804 B2
(45) Date of Patent: Apr. 24, 2018

(54) SPARK CONTAINMENT CAP

(71) Applicant: AIRBUS OPERATIONS LIMITED, Bristol (GB)

(72) Inventors: Richard Dobbin, Bristol (GB); Ben Humphrys, Chester (GB)

(73) Assignee: AIRBUS OPERATIONS LIMITED, Bristol (GB)

( * ) Notice: Subject to any disclaimer, the term of this patent is extended or adjusted under 35 U.S.C. 154(b) by 222 days.

(21) Appl. No.: 14/964,475

(22) Filed: Dec. 9, 2015

(65) Prior Publication Data

US 2016/0169266 A1   Jun. 16, 2016

(30) Foreign Application Priority Data

Dec. 16, 2014  (GB) .................................. 1422333.3

(51) Int. Cl.
*F16B 37/14* (2006.01)
*B64D 45/02* (2006.01)
*F16B 33/00* (2006.01)

(52) U.S. Cl.
CPC .............. *F16B 37/14* (2013.01); *B64D 45/02* (2013.01); *F16B 33/004* (2013.01)

(58) Field of Classification Search
CPC ......... F16B 37/14; F16B 33/004; B64D 45/02
USPC ................. 411/372.5–377, 429–431
See application file for complete search history.

(56) References Cited

U.S. PATENT DOCUMENTS

| 4,905,931 | A |   | 3/1990 | Covey |   |
|---|---|---|---|---|---|
| 5,752,795 | A | * | 5/1998 | D'Adamo | F16B 37/14 411/373 |
| 5,879,117 | A | * | 3/1999 | Chen | B60R 13/105 411/372.6 |
| 6,135,691 | A | * | 10/2000 | Nadarajah | F16B 37/14 411/372.6 |
| 6,654,436 | B2 | * | 11/2003 | Marra | F16B 37/14 376/260 |
| 7,665,941 | B2 | * | 2/2010 | Wolf | E04B 1/4157 411/429 |
| 9,133,874 | B2 | * | 9/2015 | Hill | F16B 35/00 |
| 2008/0152459 | A1 | * | 6/2008 | Tooman | F16B 37/14 411/372.5 |
| 2009/0028663 | A1 | * | 1/2009 | Stewart | F16B 23/0015 411/372.5 |
| 2014/0341675 | A1 |   | 11/2014 | Dobbin |   |

FOREIGN PATENT DOCUMENTS

| EP | 0334011 A1 | 9/1989 |
|---|---|---|
| GB | 2514171 A | 11/2014 |
| WO | 2015025130 A1 | 2/2015 |

* cited by examiner

*Primary Examiner* — Flemming Saether

(74) *Attorney, Agent, or Firm* — Hauptman Ham, LLP

(57) ABSTRACT

A spark containment cap is disclosed for enclosing an end of a fastener protruding from a structure. The cap includes a cap body having an annular base terminating at a rim which surrounds an opening into an air cavity arranged to enclose the fastener end and having an aperture in fluid communication with the cavity. An annular bead of uncured sealing material is provided around the opening into the cavity, the bead of sealing material being curable to provide a seal between the cap body and the structure to seal a volume of gas within the cavity. A closure member has a closed configuration in which it seals the aperture, and an open configuration in which it does not seal the aperture.

13 Claims, 5 Drawing Sheets

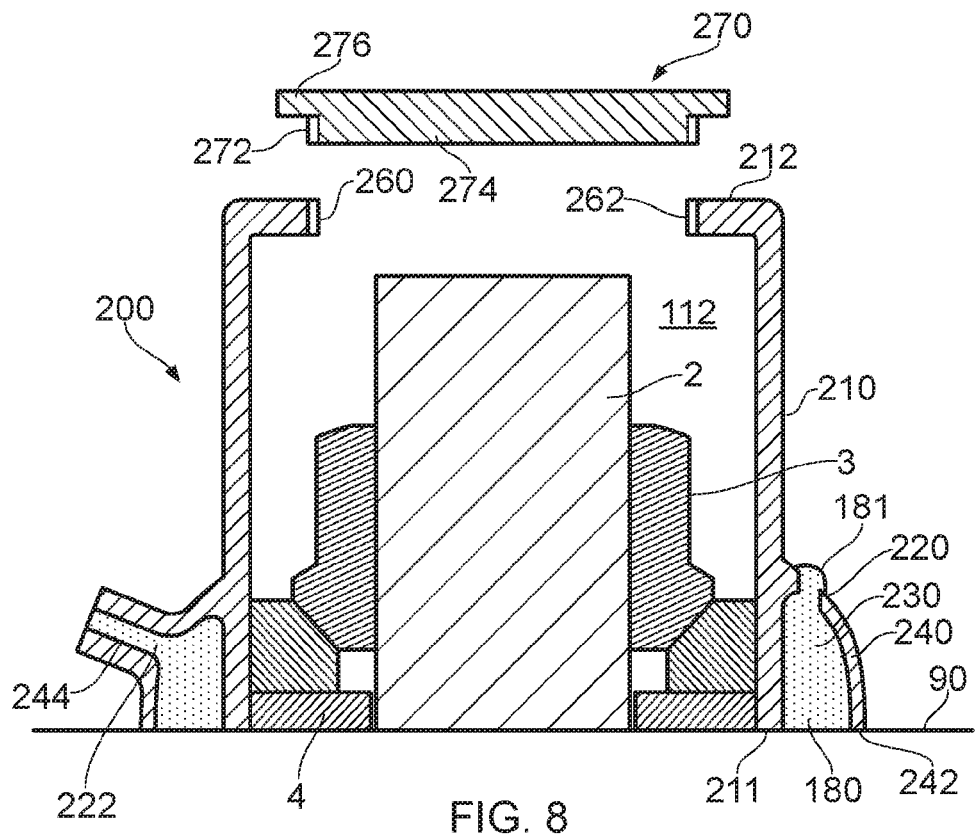
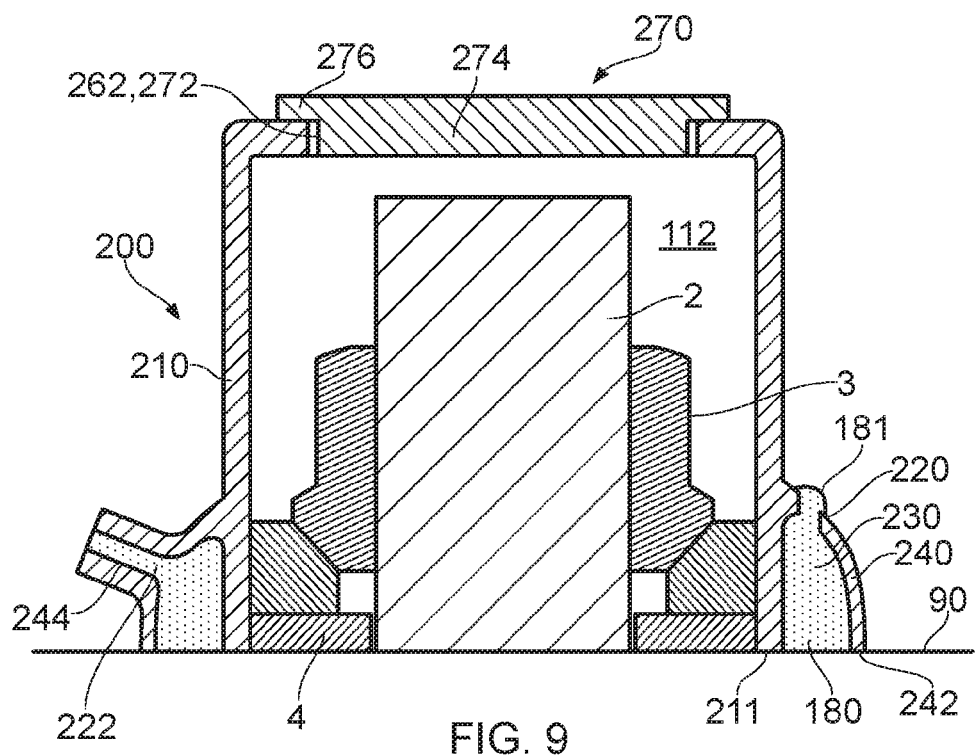

SPARK CONTAINMENT CAP

RELATED APPLICATIONS

The present application claims priority from Great Britain Application Number 1422333.3, filed Dec. 16, 2014, the disclosure of which is hereby incorporated by reference herein in its entirety.

FIELD OF THE INVENTION

The present invention relates to a cap and a kit of parts for forming a sealed cavity around one end of a fastener, a method of installing such a cap, and a joint comprising such a cap.

BACKGROUND OF THE INVENTION

Large passenger aircraft are typically struck by lightning once or twice a year, each lightning bolt striking with up to 200,000 amps of electrical current that seeks the path of least electrical resistance. Many modern passenger aircraft have exterior surfaces made from composite materials which have a very high electrical resistance. There is therefore a high probability of lightening attachment at any of the many metallic fasteners in the exterior surface, which have a much lower electrical resistance. In the wing, some of these fasteners pass through the outer wing skin into the fuel tank.

FIG. 1 is a side view of part of a fastener assembly passing through a panel 1, which may be a composite or metallic panel. The assembly comprises a fastener comprising an externally threaded bolt 2, an internally threaded nut 3, and a washer 4 (the fastener may alternatively comprise any other known fastener type, such as a rivet or swage fastener). In the event of a lightning strike hitting the panel 1 and attaching to the fastener, sparking, plasma or out-gassing may occur at the locations indicated by reference 5 in FIG. 1. The panel 1 may provide a fuel tank boundary and the fastener may therefore be immersed in fuel or fuel vapour rich gas. A lightning strike at the fastener may thus provide sparking and hot gas ignition sources which could cause ignition of the fuel.

A known method of providing spark suppression is described in EP-A-0334011. A volume of gas is enclosed by a cap around the fastener. The gas provides spark suppression for arcing that may occur between the composite structure and the metal fastener during any lightning strike.

SUMMARY OF THE INVENTION

At its most general, the invention proposes introducing an aperture into a cap body of a spark containment cap having a cavity for enclosing a fastener end, the aperture having an open configuration in which it provides fluid communication between the cavity and an external atmosphere, and a closed configuration in which it prevents such fluid communication. The cavity may be provided in the open configuration during cure of a curable bead of sealing material around the cavity, and in the closed configuration after at least partial cure of that sealing material.

A first aspect of the invention provides a spark containment cap for enclosing an end of a fastener protruding from a structure, the cap comprising: a cap body having an annular base terminating at a rim which surrounds an opening into an air cavity arranged to enclose the fastener end and having an aperture in fluid communication with the cavity; an annular bead of uncured sealing material around the opening into the cavity, the bead of sealing material being curable to provide a seal between the cap body and the structure to seal a volume of gas within the cavity; and a closure member having a closed configuration in which it seals the aperture, and an open configuration in which it does not seal the aperture.

This arrangement enables the aperture to remain open while the bead of sealing material cures, and be closed after it has at least partially cured. When the aperture is open the cavity is in fluid communication with the external atmosphere, thus ensuring that there is no, or only a minimal, pressure difference between the gas/air within the cavity and the gas/air outside the cavity. This is important because such a pressure difference may cause the gas/air to be forced into/out of the cavity so that it forms bubbles or other defects in the uncured annular bead of sealing material.

Such a pressure difference may be caused by e.g. a temperature difference between the gas/air within the cavity and the gas/air external to the cap. For example, if a prior art cap without a closable aperture is installed when the ambient temperature is low and that temperature subsequently rises, the temperature and pressure of the gas/air within the cavity will also rise; if the temperature rises by a sufficient amount before the sealing material bead is cured, the pressure within the cavity will increase to the point where, in seeking an escape path from the cavity, the gas/air will form one or more bubbles, voids or other defects in the sealing material bead.

The present inventors have realised that this problem can be avoided by providing an aperture in fluid communication with the cavity, and a closure member which can be used to seal the aperture after the sealing material bead has at least partially cured.

The bead of sealing material may, when cured, also serve to adhere the cap to the structure.

The cap is preferably for use to contain sparks and/or other out-gassing products such as plasma generated at the fastener end in the event of a lightning strike.

The closure member may comprise: a curable sealing material arranged to cure in the closed configuration; a fastener passing through the aperture in the closed configuration; or a lid arranged to interlock with the cap body in the closed configuration. Each of these arrangements provides the advantages discussed above. The lid may provide the additional advantage of enabling a visual inspection of the bead of sealing material to be made, to check for bubbles, voids or other defects.

In embodiments in which the closure member comprises a lid, the lid and the cap body may each comprise cooperating interlocking features arranged to interlock the lid with the cap body in the closed configuration. Thus, the lid may be easily installed to seal the aperture, and the interlocking features may provide the seal.

The cap may comprise an annular skirt extending from the cap body to provide arm annular sealing volume between the skirt and the annular base for containing the annular bead of sealing material. Thus, the bead of uncured sealing material may be easily applied around the cavity opening.

In some embodiments the cap may further comprise a sealant inlet hole in fluid communication with the annular sealing volume and being arranged to interconnect with a sealing material injection device to provide a flow of sealing material into the annular sealing volume via the sealant inlet hole. Thus, the bead of uncured sealing material may be easily applied by a repeatable and labour-saving injection technique.

In embodiments in which the sealant inlet hole extends through the annular skirt, the cap may be formed in one part, with an integral skirt and cap body. In other embodiments the cap body may comprise an inner cap member and the annular flange may comprise a base of an outer cap member which fits over the inner cap member, wherein the aperture extends through the inner cap member and the outer cap member.

A second aspect of the invention provides a joint comprising: a structure; a fastener having a fastener end protruding from the structure; and a spark containment cap according to the first aspect, the cap body of the spark containment cap being arranged over the fastener end so that the fastener end is enclosed within the cavity, the cap closure member being arranged in the closed configuration to seal the aperture, and the bead of sealing material being arranged between the cap body and the structure to thereby seal a volume of gas within the air cavity.

Thus, as for the first aspect, the aperture may remain open until the sealing material bead has at least partially cured to prevent a pressure difference between the cavity and the atmosphere that may lead to the formation of defects in the sealing material bead.

The structure may comprise a boundary of an aircraft fuel tank. Thus, the cap may provide a sealed volume of gas around the fastener end for the purposes of spark suppression and containment of any out-gassing products generated in the event of a lightning strike at the fuel tank.

A third aspect of the invention provides a method of installing a spark containment cap over an end of a fastener protruding from a structure, the cap including a cap body having a cavity, the method including the steps of: assembling the cap body with the fastener end so that the fastener end is enclosed within the cavity, the cap body having an aperture that is in fluid communication with the cavity; providing an annular bead of uncured sealing material between the structure and the cap; curing the bead of sealing material; and sealing the aperture to thereby seal a volume of gas within the cavity after the bead of sealing material is substantially or partially cured.

As for the first and second aspects, by sealing the aperture after the bead of sealing material has at least partially cured the air cavity remains in fluid communication with the external atmosphere, thus avoiding a pressure differential therebetween.

The method may include forming the aperture in the cap body after the step of assembling the cap body with the fastener end. In other embodiments the aperture may be formed beforehand.

BRIEF DESCRIPTION OF THE DRAWINGS

Embodiments of the invention will now be described with reference to the accompanying drawings, in which:

FIGS. 8 and 9 show cross-sectional views of a cap according to another embodiment, both during (FIG. 8) and after (FIG. 9) installation.

DETAILED DESCRIPTION OF EMBODIMENT(S)

Figure 1:
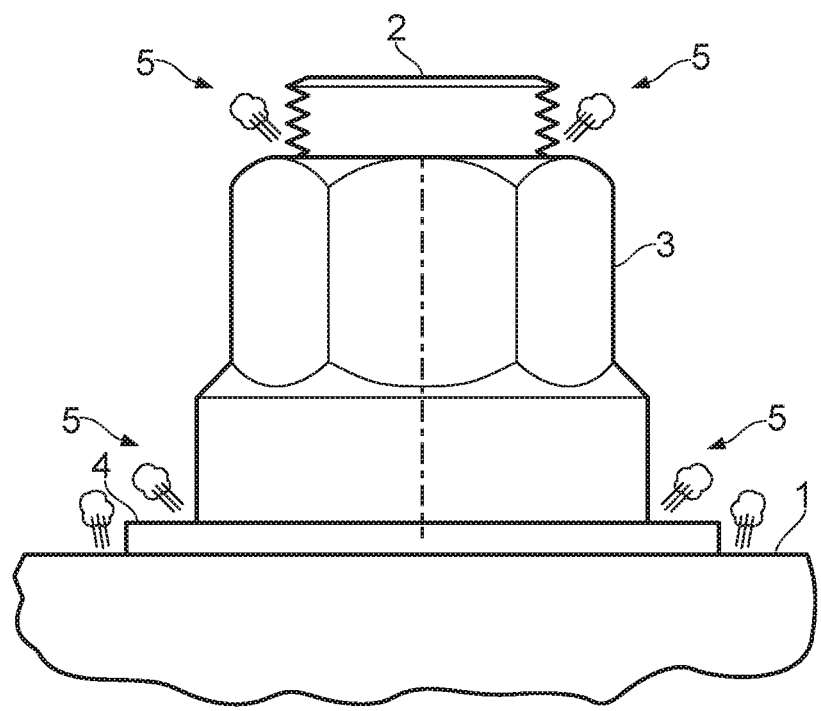
FIG. 1 shows a side view of a prior art fastener joint.
Figure 2:
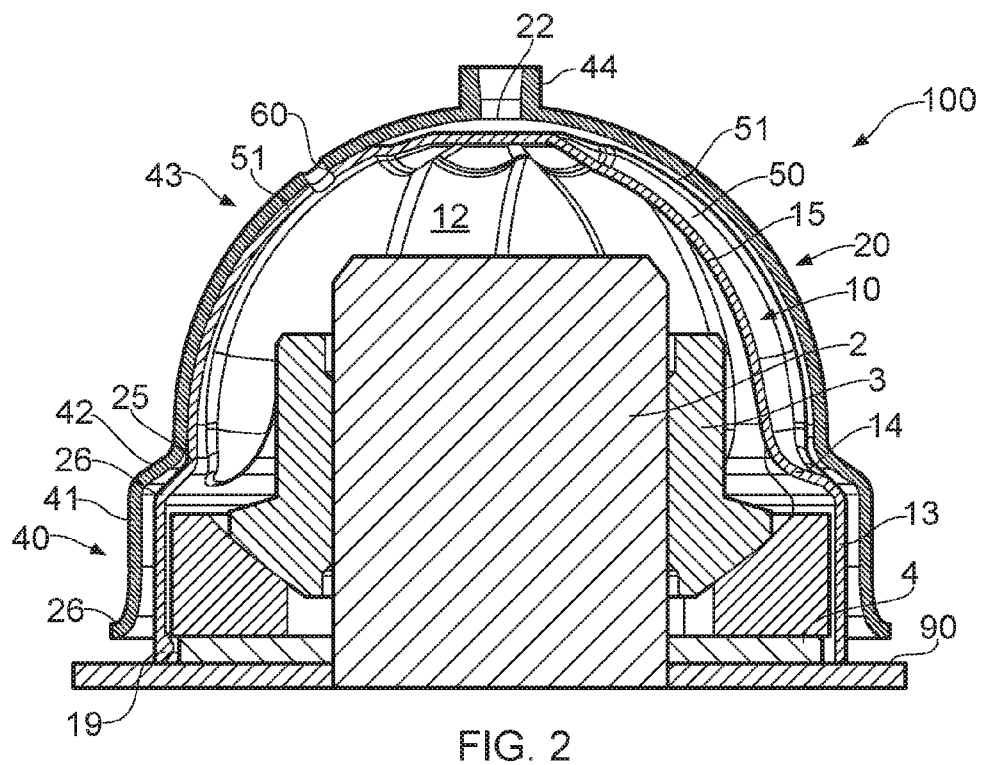
FIG. 2 shows a cross-sectional view of a cap according to an embodiment of the present invention part way through the installation process.
Figure 3:
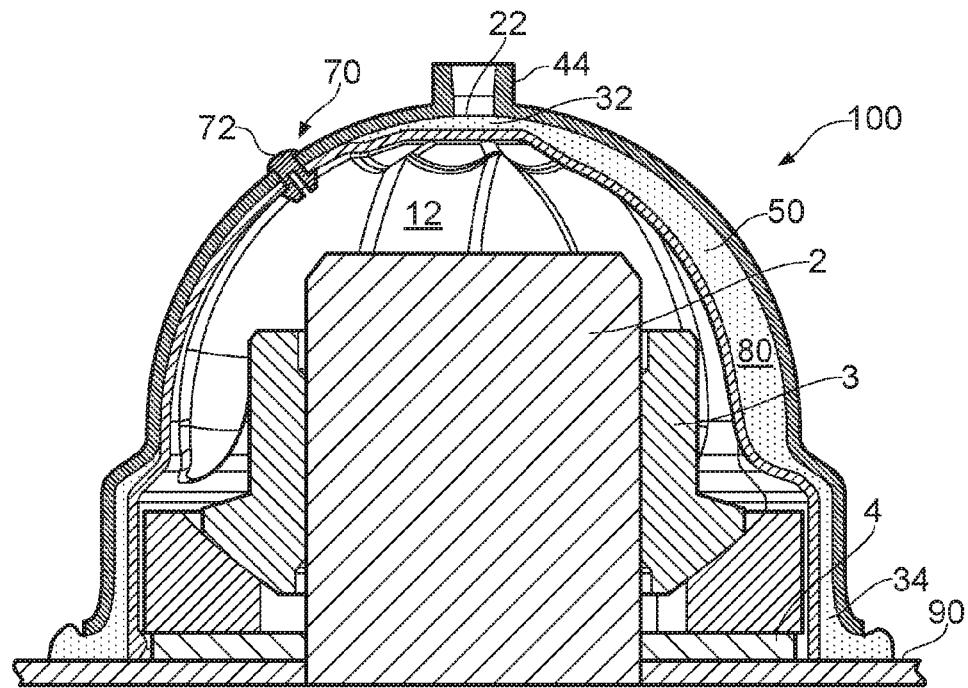
FIG. 3 shows a cross-sectional view of the cap of FIG. 2 after installation.
Figure 4:
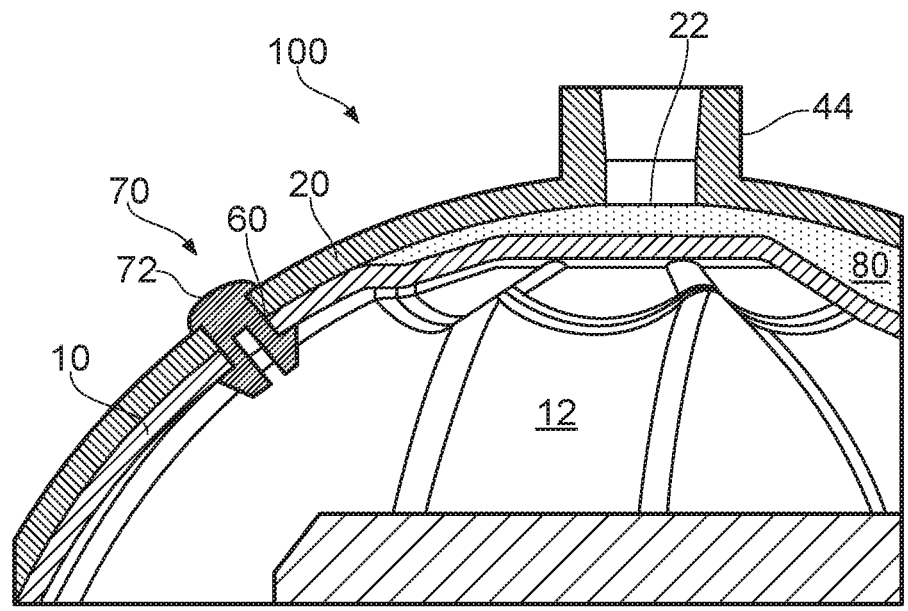
FIG. 4 shows a detail view of the cap of FIG. 3.

FIGS. 2 to 4 show an injectable nut cap 100 according to a first embodiment of the present invention. The nut cap includes an inner cap member 10 and an outer cap member 20. The inner and outer cap members 10, 20 are injection moulded from a thermoplastic material such as glass-filled polyetherimide (PEI). A suitable glass-filled PEI is Ultem™ 2400, which includes 40% glass fibres by volume. The inner and outer cap members may alternatively be made by moulding, by an additive manufacturing process, or by any other suitable process.

The inner cap member 10 is a generally thin-walled dome-shaped member, with a correspondingly dome-shaped inner air cavity 12 which encloses the tail end of a fastener protruding from a structural element, which in this embodiment is a composite aircraft structural component 90, but may be a hybrid composite-metallic component. The fastener comprises a bolt 2 in threaded engagement with a nut 3, or collar, which engages the structural component 90 via a washer 4.

The inner cap member 10 comprises an annular base 13 which has a generally cylindrical outer surface, and a domed portion 15. A frustoconical shoulder 14 joins the cylindrical portion 13 to the domed portion 15 which extends from the shoulder to an apex. An outer diameter of the inner cap reduces at the shoulder 14 so the domed portion 15 has a smaller outer diameter than the annular base 13. The outer surfaces of the shoulder 14 and the domed portion 15 meet at a concave radius 25 (labelled in FIG. 4) and the outer surfaces of the shoulder 14 and the annular base 13 meet at a convex radius 26.

The exposed edge, or rim, 18 of the annular base 13 abuts the structural element 90 to fully encapsulate the tail end of the fastener within the air cavity 12. The annular base 13 has mechanical locking features for providing a mechanical connection between the inner cap member 10 and the fastener. In this example, the washer 4 has a reduced diameter compared with the nut 3 so that the overhanging part of the nut mates with three snap-fit projecting hooks 19 protruding from the inner surface of the cylindrical portion 13. These hooks 19 prevent the cap from being forced away from the structure 50 by the pressure of sealant material as it is injected.

The outer cap member 20 is also a generally thin-walled dome shaped member, and is shaped to fit over the inner cap member 10 so that a sealing volume is defined therebetween. The outer cap member 20 is generally made up of an annular skirt 40 and a smaller diameter domed portion 43. The annular skirt 40 has a cylindrical portion 41, a shoulder 42, and a flared lip 26 at its free edge. A boss 44 at the apex of the domed portion 43 defines an opening 22 in fluid engagement with the sealing volume, the boss 44 being sized to interconnect with the nozzle (not shown) of a sealing material injector gun to enable sealing material 80 to be injected into the sealing volume as described below.

The inner cap member 10 has side walls with a substantially uniform wall thickness. The side walls are corrugated to form six (or another suitable number thereof) radially outwardly projecting ridges 51 which between them define six channels 50 in an outer surface of the domed portion 15 of the inner cap member 10. The ridges 51 abut the inner surface of the domed portion 43 of the outer cap member 20 as shown in FIG. 2 so that the respective domed portions of the inner 10 and outer 20 caps are in contact over the surface area of the ridges 51, but are separated by a radial gap at the channels 50 formed between those ridges. The channels 50 thus provide a route via which sealing material 80 injected through the opening 22 via the boss 44 can flow between the domed portions of the inner 10 and outer 20 caps.

The sealing volume between the inner and outer cap members 10, 20 has three key regions: a reservoir 32 comprising a recess in an outer surface of the apex of the inner cap 10 directly beneath the sealing material inlet opening 22; an annular sealing volume (or pocket) 34 between the skirt 40 of the outer cap 20 and the annular base 13 of the inner cap 10; and the channels 50 which interconnect the reservoir 32 and the annular sealing volume 34.

The nozzle of the sealing material injection device (not shown) delivers a continuous flow of sealing material 80 into the sealing volume via the opening 22. In the present embodiment a two-part polysulphide (or polysulfide) based sealant, such as Chemetall Naftoseal™ MC238, or an appropriate polythioether sealant material, is suitable. Such sealants are either pre-mixed or mixed prior to application in a supplied cartridge of the injection device.

Alternatively, a two-part epoxy based structural adhesive such as Scotch-Weld™ 7256 B/A, produced by 3M™, may be used. These adhesives are supplied in cartridge form (50-250 ml cartridges being preferred and mixed within the nozzle on application by the injector gun.

Such sealing materials are free-flowing, have a low viscosity, and exhibit rapid cure at room temperature. The reservoir 32 is directly below the opening 22 so that it receives sealing material directly therefrom. The reservoir 32 serves to improve the flow of sealing material into the annular sealing volume 34 by providing a relatively low flow resistance, and also serves to provide an even, uniform flow into the channels 50. Once cured, the sealing material within the channels 50 serves to bond the inner cap member 10 and outer cap member 20 together, and adds structural rigidity to the cap 100.

The annular sealing volume 34 is open at its lower face such that the sealing material can flow outwardly from the annular sealing volume and into contact with the structural element 90. The sealing material then forms an annular bead around the periphery of the nut cap 100 (see in particular FIG. 3), the bead of sealing material serving to seal the cavity 12 in order to prevent escape of outgassing products, and to adhere the nut cap 100 to the structural element 90.

The lip 26 is axially offset from the base edge 18 of the inner cap member 10. This arrangement ensures that the outer cap member 20 does not clash with features of the structural element 90, such as ramps or radii (fillets), in the event that the fastener is located very close to such features. Such a potential clash is not uncommon in aircraft structures, where it is possible for the outer edge of a fastener to be located less than 1.6 mm from the tangent of a fillet with a 5 mm radius. It also ensures that the seal is able to accommodate small surface feature deviations in the structural element 90, and is sufficiently thick to have a degree of flexibility once cured.

The cap 100 further includes a vent hole 60 which is in fluid communication with the air cavity 12 and the atmosphere/environment. The vent hole 60 extends through both the inner 10 and outer 20 caps, at a location at which the inner 10 and outer 20 caps are in contact. In the present embodiment the vent hole 60 passes through a ridge 51 of the inner cap 10, and the axis of the vent hole 60 is substantially perpendicular (i.e. normal) to the surface of the outer cap 20 at the hole location.

The vent hole 60 may be pre-formed by forming respective corresponding holes in the inner 10 and outer 20 caps, either by forming during the moulding process or by subsequent processing steps such as drilling or similar. Alternatively, the vent hole 60 may be formed after assembly of the inner 10 and outer 20 caps by drilling (or similar) through both parts at once. Such a drilling operation may take place before or after the installation of the cap 100 over the fastener end, but should take place at least before curing of the sealing material.

The vent hole 60 must be plugged after the sealing material has cured (or at least partially cured) in order to seal the air cavity 12. As shown in FIGS. 3 and 4, in the present embodiment the vent hole 60 is plugged by a closure member 70 in the form of a plastic plug 72 in order to prevent fluid (e.g. air and/or fuel) from either entering or exiting the air cavity 12.

The vent hole 60 may be located at any part of the cap 100 at which a fluid communication channel between the cavity 12 and the external environment can be provided. In the embodiments of FIGS. 1-6 the vent hole 60 is located towards the apex of the cap 100. In the embodiment of FIG. 7, however, the vent hole is located at the base of the domed portions of the inner 10 and outer 20 caps, near the junction with the skirt 40 of the outer cap 20. The position of the vent hole 60 may be chosen according to the particular design features of the cap 100 and/or any manufacturing/assembly considerations.

Figure 5:
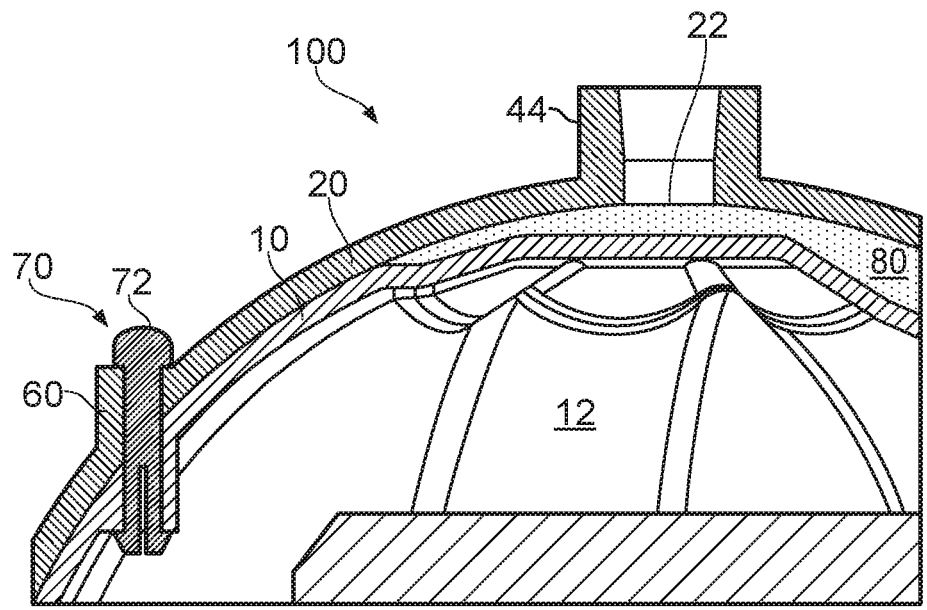
FIG. 5 shows a detail view of an alternative embodiment.

FIG. 5 illustrates an alternative arrangement in which the vent hole 60 is pre-formed in the inner 10 and outer 20 caps as part of the moulding process so that the axis of the vent hole 60 is substantially aligned with the axis of the cap 100, and a generally elongate plug 72 fills the vent hole 60. The inner 10 and outer 20 caps are built up in the region of the vent hole 60 to form two collar portions which enclose the elongate vent hole 60.

Figure 6:
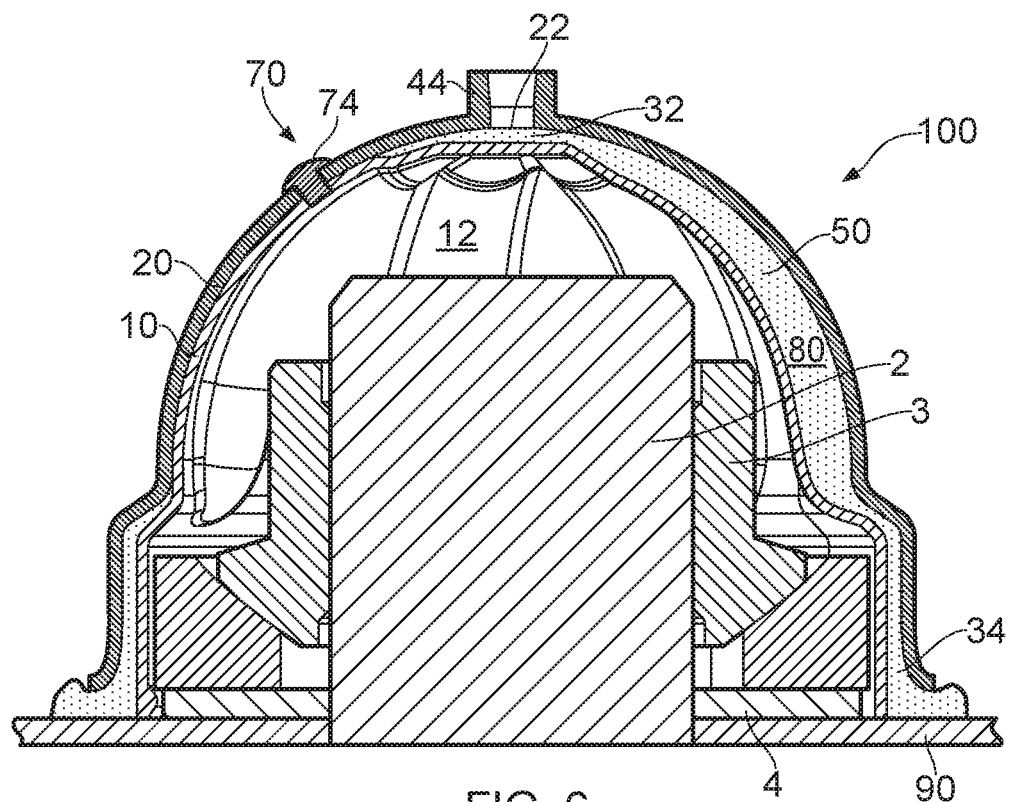
FIGS. 6 and 7 show cross-sectional views of caps according to further alternative embodiments.
Figure 7:
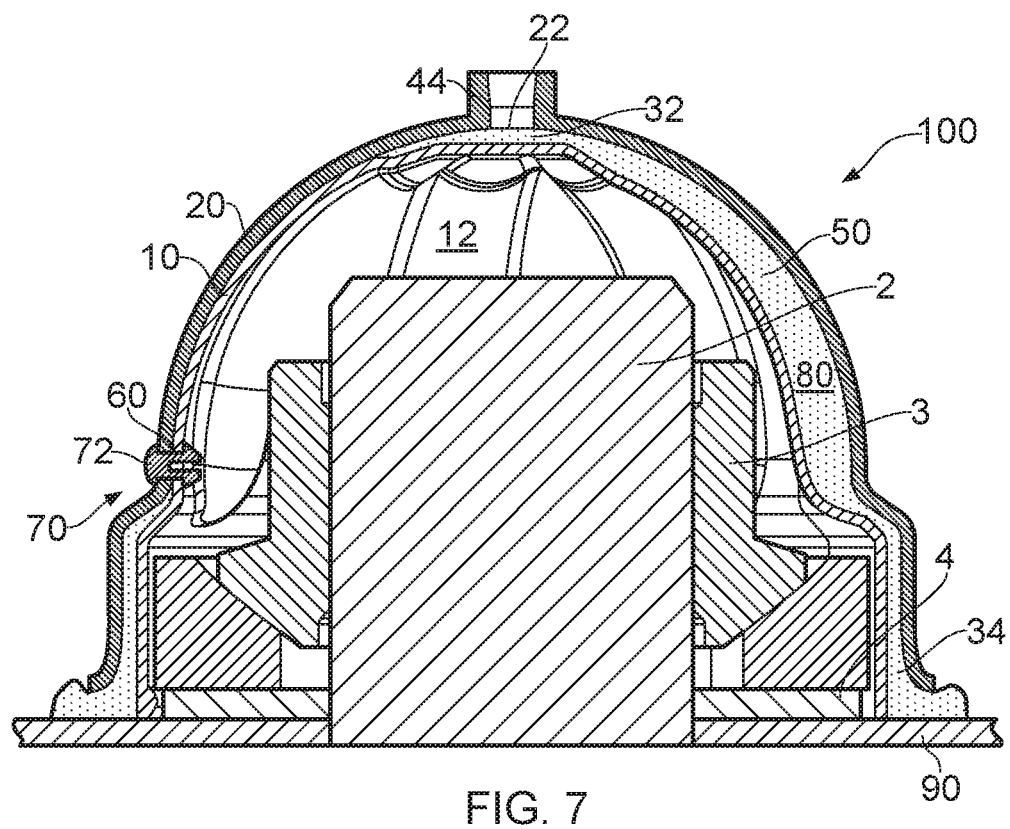

In the embodiment of FIG. 6 the closure member 70 comprises a plug 74 of sealing material or adhesive, such as epoxy, which is applied in and/or over the vent hole 60 and subsequently cured to achieve a seal. In other embodiments the closure member 70 may be any suitable fastener type. For example, the closure member 70 may comprise a rivet, or a screw (e.g. a grub screw) which engages a cooperating female threaded portion of the vent hole 60. Such fasteners may be supplemented by the addition of a sealant material or a small gasket to enhance the sealing effect of the closure member 70.

During installation, the cap 100 is first placed in the position shown in FIG. 2, with the tail end (or alternatively the head end) of the fastener enclosed within the air cavity 12. The vent hole 60 is open so that there is fluid communication between the cavity 12 and the atmosphere external to the cap 100. A nozzle (not shown) of a sealing material injector gun is then fitted over the boss 44 to create a temporary seal therebetween. Pre-mixed sealing material 80 is then injected from the nozzle into the reservoir 32, where it collects. When the reservoir 32 is full it overflows, causing an evenly distributed flow of sealing material into the channels 50. Once the channels 50 are filled the pressure of the sealing material 80 increases to a level at which it is forced from the channels 50 into the annular sealing volume 34. The sealing material completely fills the annular sealing volume 34 until it flows out and into contact with the structure 90, at which point the flow of sealing material 80 from the nozzle is stopped.

After injection of the curable sealing material 80 into the sealing volume the nozzle is removed and the injected sealing material is left to cure. On curing, it provides a strong adhesive bond between the cap 100 and structure 90, and also between the inner and outer cap members 10, 20. The sealing material 80 may cure to handling strength (i.e. a degree suitable to provide sufficient strength to withstand knocks or similar from assembly workers) in approximately 40 minutes for epoxy-based adhesive sealing materials, one hour for polythioether sealants, or over four hours for polysulphide sealants.

During cure of the sealing material 80 (or at least until the sealing material is partially cured) the vent hole 60 remains open, so that the air pressure within the air cavity 12 is equalised with the atmospheric pressure. Thus, there is no (or only a negligible) pressure differential to cause air within the air cavity 12 to either force its way into or out of the cavity via the base opening of the cavity, such a forced movement of air being undesirable since it may cause the formation of air bubbles within the sealing material bead in the annular sealing volume 34. Such air bubbles are undesirable because they may compromise the quality of the seal around the cavity and thereby cause leakage of fuel through the fastener joint and/or may provide sites for uncontrolled sparking or out-gassing events.

Once the sealing material 80 has cured, or at least partially cured, the vent hole 60 is plugged by the closure member 70. In embodiments in which the closure member is a fastener such as a plastic plug 72 (FIGS. 2-5 and 7), a film of sealing material or other bonding agent may be applied around the periphery of the closure member before it is inserted through the vent hole 60 in order to ensure a good seal. In embodiments in which the closure member 70 comprises a blob of sealing material 74 (FIG. 6), the sealing material 74 is applied so that it at least partially fills the vent hole 70 and provides a protective cap extending over the outer face of the vent hole 70.

Once cured, the injected sealing material 80 and the closure member 70 together serve to fully seal the air cavity 12. Thus, trapped air within the air cavity 12 can provide a safe environment within which sparking and out-gassing events caused during a lightning strike can be contained. Ingress of fuel, water or other contaminants into the air cavity 12 is also prevented.

In further embodiments the vent hole 60 may be sufficiently large to permit visual inspection of the internal cavity 12 after injection of the sealing material. In such embodiments the closure member 70 may comprise a lid. Such an embodiment is illustrated in FIGS. 8 and 9, in which the nut cap 200 is similar in design to the nut caps 100 of FIGS. 2-7, but is formed in one piece, without separate inner 10 and outer 20 caps. Those features which are common to both embodiments will not be described further below.

The cap 200 has a cap body with a generally flat circular end wall 212 and a cylindrical base 210 terminating at a rim 211 which surrounds an opening into a central cavity 112. The rim 211 lies in a generally flat plane so it can intimately engage with the planar surface of the structure 90 around its full circumference when the cap is fitted over the end of the fastener as shown in FIGS. 8 and 9.

An annular skirt 240 projects outwardly from the cylindrical base 210 at a position axially offset from the rim 211 and terminates at a skirt rim 242 which lies in the same plane as the rim 211 of the annular base. In other embodiments the skirt rim 242 may be axially offset from the rim 211. Like the base rim 211, the skirt rim 242 also contacts the planar surface of the structure 90 around the full closed circumference of the skirt rim 242. The skirt 240 has a flared shape so that it extends away from the body at an angle to the central cap axis.

An annular sealing volume (or pocket) 230 is provided between the skirt 240 and the base 210. The sealing volume 230 extends from a closed end at the junction between the skirt 240 and the base 210, to an open end at the skirt rim 242. Due to the flared shape of the skirt, the sealing volume 230 has a radial width which increases as it extends from its closed end to its open end.

The circular end wall 212 of the cap body has a central vent opening 260 which has a sufficiently large diameter to permit visual inspection of the contents of the cavity 112. The peripheral edge wall of the vent opening 260 is formed with a female screw thread 262 which is configured to cooperate with a corresponding male screw thread 272 of a lid 270 which provides a closure member for plugging the vent opening 260. The lid 270 is shown prior to installation within the vent opening 260 in FIG. 8, and after installation in FIG. 9. The lid 270 comprises a generally disc-shaped member which has a circular plug portion 274 which carries the male thread 272, and a gripping portion 276 which projects beyond the end wall 212 in the axial direction, and extends beyond the periphery of the opening 260 in the radial direction, when the lid 270 is installed. The gripping portion 276 is shaped to cooperate with tooling for tightening the lid 270; for example, the gripping portion may have flat edge surfaces for cooperating with a socket (not shown) of an air gun.

The skirt has a projecting tubular boss 244 which projects outwardly from the skirt and provides an injection channel leading to a circular inlet hole 222. The tubular boss 244 is arranged to interconnect with a nozzle (not shown) of a sealing material injection device to provide a flow of sealing material through the skirt via the inlet hole 222 into the annular sealing volume 230.

The skirt 240 also has an outlet hole 220 on an opposite side of the cap axis to the inlet hole 222. The outlet hole 220 is in fluid communication with the sealing volume 230 and is arranged to enable air to escape the sealing volume 230 through the skirt via the outlet hole 220 as the sealing material flows from the inlet hole 222 into the sealing volume. When the sealing volume is full, then the pressure within increases until it forces sealing material to escape the sealing volume through the skirt via the outlet hole 220. When this flow of sealing material out of the outlet hole 220 is visually observed, the flow of sealing material from the sealing material injection device is stopped.

During curing of the sealing material the lid 160 is in its uninstalled state, as shown in FIG. 8. This is to prevent a pressure differential between the air cavity 112 and the atmosphere surrounding the cap 200, as described above in relation to the first embodiment. The sealing material is then allowed to cure, leaving a cured sealing material 180 in the sealing volume which secures the cap 200 to the structure and forms an annular bead of sealing material around the cavity 112. The cured sealing material has a small stub 181 protruding from the outlet hole 220. Cured sealing material 180 also fills the injection channel and the inlet hole 222.

After the sealing material has cured, or at least partially cured, the lid 270 is installed within the vent opening 260 in order to seal the cavity 112. The lid 270 may be formed with an integral seal portion (not shown) such as an elastomeric O-ring, or a sealing compound such as a non-setting joint compound, polysulphide sealant or epoxy adhesive may be used to wet assemble the lid 270 with the opening 260. Alternatively, the lid 270 may be permanently joined to the end wall 212 by welding or other joining operation after installation in order to provide a sealed joint. A tamper-evident indicator or zip tie lock (not shown) may be applied after installation of the lid 270 to prevent, and/or provide evidence of, subsequent damage to the lid/opening joint.

The sealing material bead of the sealing volume 230 and the installed lid 270 together seal the cavity 112 to thereby prevent the ingress of water or other contaminants into the cavity 112, and also prevent plasma or other out-gassing products from exiting the cavity 112 in the event of a lightning strike.

In the illustrated embodiment of FIGS. 8 and 9 the outlet hole 220 is formed in the body of the skirt 230 as a closed hole with a portion of skirt between the outlet hole 220 and the skirt rim 242. In other embodiments the outlet hole 220 may be formed as a recess, or notch, in the skirt rim 242.

Although the invention has been described above with reference to one or more preferred embodiments, it will be appreciated that various changes or modifications may be made without departing from the scope of the invention as defined in the appended claims.

In particular, the vent hole 60 and closure members 70 of the embodiments of FIGS. 2-7 may be applied to single-piece caps 200 of the type shown in FIGS. 8 and 9. Similarly, the vent opening 260 and closure lid 270 of the embodiment of FIGS. 8 and 9 may be applied to two-part caps such as those 100 shown in FIGS. 2-7.

The invention claimed is:

1. A spark containment cap for enclosing an end of a fastener protruding from a structure, the cap comprising:
    a cap body having an annular base terminating at a rim which surrounds an opening into an air cavity arranged to enclose the fastener end and having an aperture in fluid communication with the cavity;
    an annular bead of uncured sealing material around the opening into the cavity, the bead of sealing material being curable to provide a seal between the cap body and the structure to seal a volume of gas within the cavity; and
    a closure member having a closed configuration in which it seals the aperture, and an open configuration in which it does not seal the aperture.

2. A cap according to claim 1, wherein the closure member comprises a curable sealing material arranged to cure in the closed configuration.

3. A cap according to claim 1, wherein the closure member comprises a fastener passing through the aperture in the closed configuration.

4. A cap according to claim 1, wherein the closure member comprises a lid arranged to interlock with the cap body in the closed configuration.

5. A cap according to claim 4, wherein the lid and the cap body each comprise cooperating interlocking features arranged to interlock the lid with the cap body in the closed configuration.

6. A cap according to claim 1, wherein the cap comprises an annular skirt extending from the cap body to provide an annular sealing volume between the skirt and the annular base for containing the annular bead of sealing material.

7. A cap according to claim 6, wherein the cap comprises a sealant inlet hole in fluid communication with the annular sealing volume and arranged to interconnect with a sealing material injection device to provide a flow of sealing material into the annular sealing volume via the sealant inlet hole.

8. A cap according to claim 7, wherein the sealant inlet hole extends through the annular skirt.

9. A cap according to claim 6, wherein the cap body comprises an inner cap member and the annular skirt comprises a base of an outer cap member which fits over the inner cap member, and wherein the aperture extends through the inner cap member and the outer cap member.

10. A joint comprising:
    a structure;
    a fastener having a fastener end protruding from the structure; and
    a spark containment cap according to claim 1, the cap body of the spark containment cap being arranged over the fastener end so that the fastener end is enclosed within the cavity, the cap closure member being arranged in the closed configuration to seal the aperture, and the bead of sealing material being arranged between the cap body and the structure to thereby seal a volume of gas within the air cavity.

11. A joint according to claim 10, wherein the structure comprises a boundary of an aircraft fuel tank.

12. A method of installing a spark containment cap over an end of a fastener protruding from a structure, the cap including a cap body having a cavity, the method including the steps of:
    assembling the cap body with the fastener end so that the fastener end is enclosed within the cavity, the cap body having an aperture that is in fluid communication with the cavity;
    providing an annular bead of uncured sealing material between the structure and the cap;
    curing the bead of sealing material; and
    sealing the aperture to thereby seal a volume of gas within the cavity after the bead of sealing material is substantially or partially cured.

13. A method according to claim 12, wherein the method includes forming the aperture in the cap body after the step of assembling the cap body with the fastener end.

* * * * *